United States Patent [19]
Navarro et al.

[11] Patent Number: 5,150,626
[45] Date of Patent: Sep. 29, 1992

[54] APPARATUS WITH ROTATABLY-DRIVEN ASYMMETRICALLY-ACCELERATED ECCENTRIC MASS FOR GENERATING TRANSLATIONAL FORCE

[76] Inventors: Thomas L. Navarro, 2914 Benton St., Wheatridge, Colo. 80214; James D. Isaacson, 535 Pennsylvania St., Denver, Colo. 80203

[21] Appl. No.: 733,294

[22] Filed: Jul. 22, 1991

Related U.S. Application Data

[63] Continuation-in-part of Ser. No. 675,700, Mar. 27, 1991, abandoned.

[51] Int. Cl.$^5$ .............................................. F16H 33/20
[52] U.S. Cl. ........................................ 74/84 R; 74/61
[58] Field of Search .................. 74/84 R, 84 S, 87, 61

[56] References Cited

U.S. PATENT DOCUMENTS

| | | | |
|---|---|---|---|
| 3,913,409 | 10/1975 | Opderbeck | 74/61 |
| 4,241,615 | 12/1980 | Ryan | 74/87 X |

FOREIGN PATENT DOCUMENTS

| | | | |
|---|---|---|---|
| 2456861 | 1/1981 | France | 74/84 S |
| 1384345 | 3/1988 | U.S.S.R. | 74/87 |
| 2096268 | 10/1982 | United Kingdom | 74/84 R |

*Primary Examiner*—Allan D. Herrmann
*Attorney, Agent, or Firm*—John R. Flanagan

[57] ABSTRACT

A rotatably-driven asymmetrically-accelerated mass apparatus generates a substantially translational force with interaction with its external environment. The apparatus has an orbital frame mounted to a main frame and attached to a rotary drive shaft for undergoing revolution about a central axis upon operation of a drive unit. The orbital frame has at least one and preferably a plurality of support shafts defining separate orbital axes angularly spaced from one another about the central axis and located radially outwardly of and substantially parallel to the central axis. An orbital member is mounted to each support shaft for undergoing revolution with the orbital frame about the central axis. Each orbital member also is mounted to the support shaft for undergoing rotation about its orbital axis and for predisposing its center of mass in eccentric relation, and at a preset angular position relative, to the orbital axis. A mechanism is coupled to the orbital members for producing rotation of the orbital members in a first direction about their respective orbital axes at the same frequency as the orbital members undergo revolution with the orbital frame in an opposite second direction about the central axis so as to maintain the eccentric centers of mass of the orbital members at the respective preset angular positons relative to the orbital axes and thereby produce asymmetrical acceleration of the orbital members relative to the central axis to impart a substantially translational force to the main frame of the apparatus.

12 Claims, 6 Drawing Sheets

APPARATUS WITH ROTATABLY-DRIVEN ASYMMETRICALLY-ACCELERATED ECCENTRIC MASS FOR GENERATING TRANSLATIONAL FORCE

CROSS-REFERENCE TO RELATED APPLICATION

This application is a continuation-in-part of our co-pending U.S. Pat. application Ser. No. 675,700, filed Mar. 27, 1991 now abandoned.

BACKGROUND OF THE INVENTION

1. Field of the Invention

The present invention generally relates to force generating systems and, more particularly, is concerned with an apparatus that is rotatably-driven and produces asymmetrical acceleration of eccentric mass for generating translational force from interaction with a generally flat stationary frictional force-generating surface in the external environment.

2. Description of the Prior Art

Propulsive systems for driving a vehicle and flying an airplane can and typically do rely on interactions with their external environments to generate translational motion. For instance, travel of a vehicle is generated by friction between it rotatably-driven wheels and the road, whereas the flight of an airplane is generated by the pull of propellers against the air or the thrust or push of jet engines against the air.

SUMMARY OF THE INVENTION

The present invention provides a translational force generating apparatus not known heretofore in the prior art. The apparatus of the present invention is rotatably-driven and produces asymmetrical acceleration of eccentric mass for generating translational force from interaction with a generally flat stationary frictional force-generating surface in the external environment. One example of a useful application for the translational force generating apparatus is as a drive mechanism for a vehicular novelty or entertainment device, such as a toy.

Accordingly, the present invention is directed to a translational force generating apparatus which comprises: (a) means for generating rotary drive motion; (b) orbital means attached to the rotary drive motion generating means for undergoing revolution about a central axis upon operation of the rotary drive motion generating means, the orbital means having a portion defining an orbital axis located radially outwardly of and substantially parallel to the central axis; (c) an orbital mass mounted to the orbital means portion for undergoing revolution with the orbital means about the central axis, the orbital mass also mounted to the orbital means portion for undergoing rotation about the orbital axis and for predisposing the center of mass of the orbital mass in an eccentric relation, and at a preset angular position relative, to the orbital axis; and (d) means coupled to the orbital mass for producing rotation of the orbital mass in a first direction about the orbital axis at the same frequency that the orbital mass undergoes revolution with the orbital means in a second opposite direction about the central axis so as to maintain the eccentric center of mass of the orbital mass at the preset angular position relative to the orbital axis and thereby produce an asymmetrical acceleration of the orbital mass relative to the central axis so as to impart a substantially translational force to the apparatus.

Also, the present invention is directed to a translational force generating apparatus which comprises: (a) a main frame; (b) a rotary drive mechanism mounted on the main frame; (c) an orbital frame mounted to the main frame and attached to the rotary drive mechanism for undergoing revolution about a central axis upon operation of the rotary drive mechanism, the orbital frame having at least one and preferably a plurality of support shafts defining at least one and preferably a plurality of orbital axes angularly spaced from one another and located radially outwardly of and substantially parallel to the central axis; (d) an orbital member mounted to each of the support shafts of the orbital frame for undergoing revolution with the orbital frame about the central axis, the orbital members also mounted to the support shafts for undergoing rotation about the respective orbital axes and for predisposing the centers of mass of the orbital members in eccentric relation, and at preset angular positions relative, to the respective orbital axes; and (e) means coupled to the orbital members for producing rotation of the orbital members in a first direction about the respective orbital axes at the same frequency that the orbital members undergo revolution with the orbital frame in a second opposite direction about the central axis so as to maintain the eccentric centers of mass of the orbital members at the preset angular positions relative to the orbital axes and thereby produce an a symmetrical acceleration of the orbital members relative to the central axis to impart a substantially translational force to the main frame of the apparatus.

Some of the components of the translational force generating apparatus can be implemented in different ways. In one implementation, the apparatus is basically mechanical in nature. The orbital members are plates eccentrically attached to the support shafts of the orbital frame. The rotation-producing coupling means is a plurality of pairs of spaced pulleys and belts entrained about the pulleys for transmitting rotary motion from an output drive shaft of the rotary drive mechanism to each of the plates. The rotary motion is transmitted so as to rotate each of the plates about its orbital axis in the first direction which is the reverse of the second opposite direction of revolution of the orbital frame and plate. In another mechanical implementation, the orbital members and rotation-producing coupling means are a plurality of sets of intermeshing gears.

In another implementation, the apparatus is basically electro-magnetic in nature. The orbital members are armatures attached to the orbital frame with their centers of mass offset in eccentric relation to the orbital axes. The rotation-producing coupling means is an annular stator surrounding the orbital armatures. The interactions between electro-magnetic fields of the stationary stator and orbital armatures cause each of the armatures to rotate about its orbital axis in a first direction which is the reverse of the second opposite direction of revolution of the orbital frame and armature.

In each of the implementations, the orbital member can have one of two different arrangements. In a first arrangement, the orbital member includes a mass which is stationarily mounted thereon so as to fix the location of the center of mass of the orbital member as it rotates about its orbital axis. Alternatively, in a second arrangement, the orbital member can include a mass which is mounted to the orbital member by a spring which permits the location of the center of mass of the orbital member to move primarily along a radial line as the member rotates about its orbital axis. Some movement of the spring-mounted mass can also occur in a transverse relation to the radial line.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Translational Force Generating Apparatus

Figure 1:
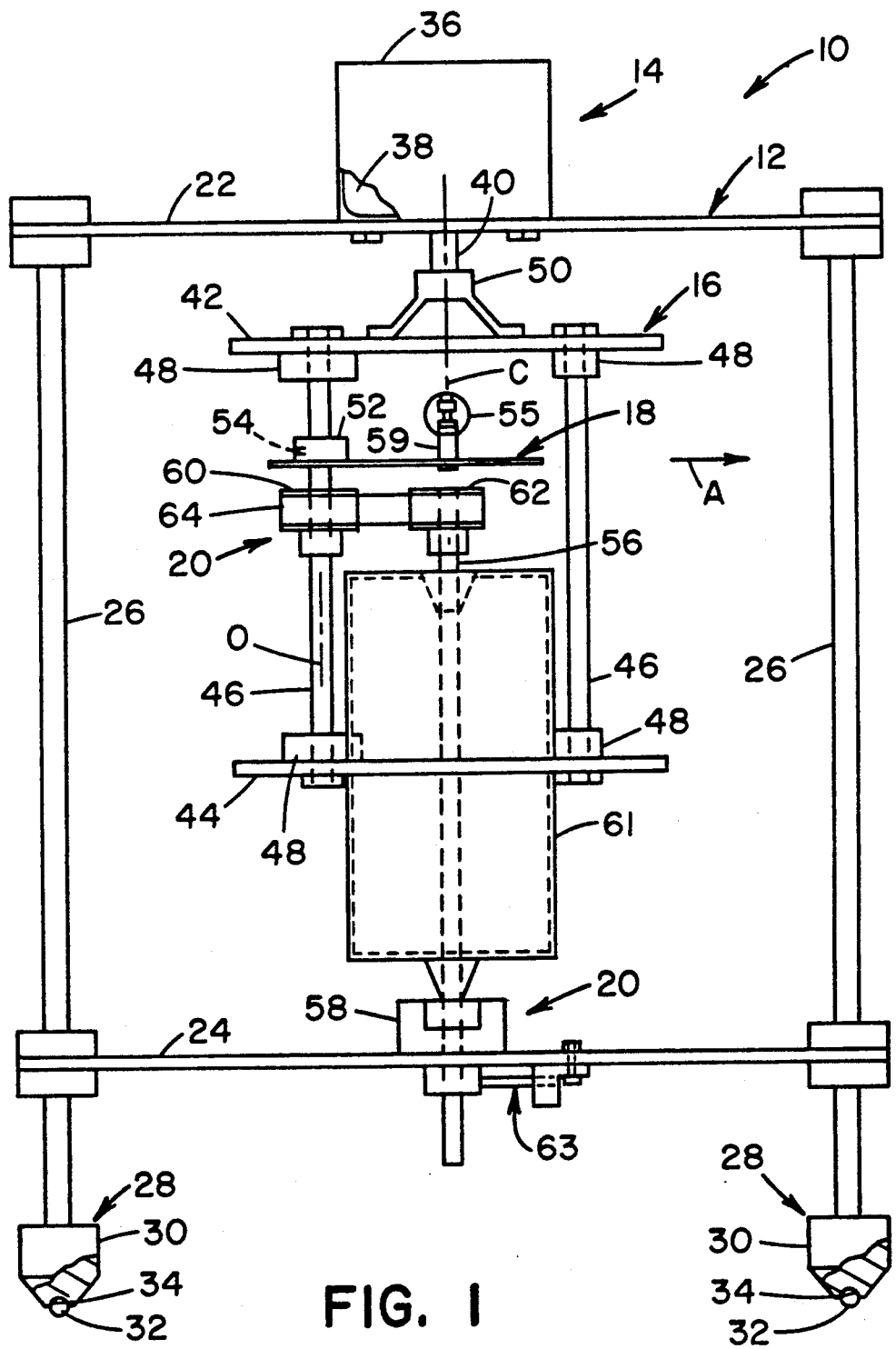
FIG. 1 is a side elevational view of one embodiment of a first mechanical implementation of the translational force generating apparatus of the present invention.
Figure 2:
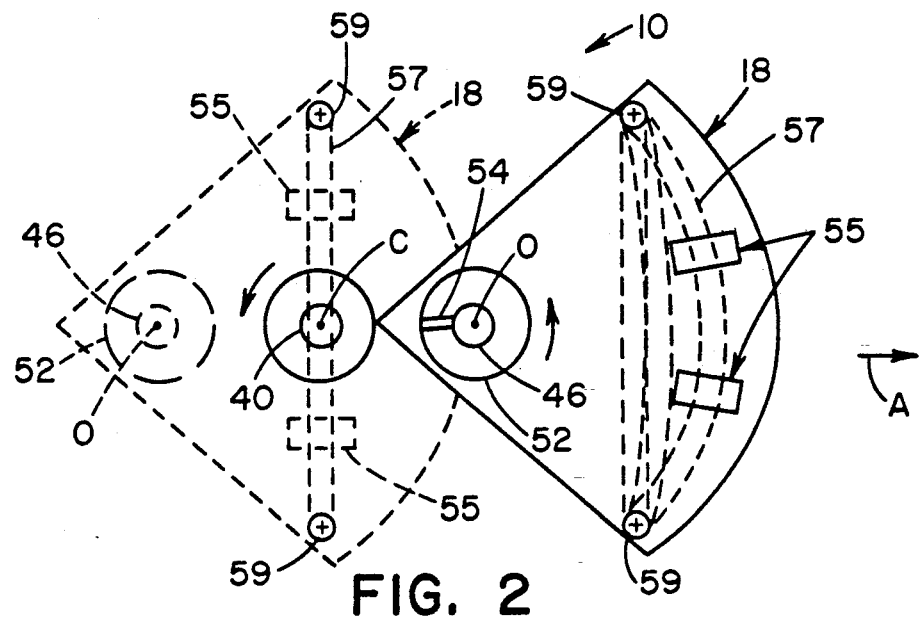
FIG. 2 is an enlarged plan view of the embodiment of the translational force generating apparatus of FIG. 1.

Referring to the drawings, and particularly to FIGS. 1 and 2, there is illustrated one embodiment of a first mechanical implementation of the translational force generating apparatus, generally designated 10, of the present invention. In its basic components, the translational force generating apparatus 10 includes a main frame 12, a rotary drive mechanism 14, an orbital frame 16, an orbital mass or member 18, and a coupling mechanism 20. The rotary drive mechanism 14 is mounted to the main frame 12. The orbital frame 16 is mounted to the main frame 12 and attached to the rotary drive mechanism 14 for undergoing revolution about a central axis C upon operation of the rotary drive mechanism 14. The orbital member 18 is mounted to the orbital frame 16 for undergoing revolution with the orbital frame about the central axis C. The orbital member 18 is also mounted to the orbital frame 16 for undergoing rotation about an orbital axis 0 defined on the orbital frame 16 and with its center of mass predisposed in eccentric relation to and a preset angular position relative orbital axis 0. The coupling mechanism 20 is coupled to the orbital member 18 for producing rotation of the orbital member 18 in a first direction about its orbital axis 0 at the same frequency that the orbital member 18 undergoes revolution with the orbital frame 16 in a second opposite direction about the central axis C. In such manner, the center of mass of the orbital member 18 is maintained at the respective preset angular position relative to the orbital axis 0 and the orbital member 18 is asymmetrical accelerated relative to the central axis C so as to impart a substantially translational force to the main frame 12 of the apparatus 10, in the direction of the arrow A.

The main frame 12 of the apparatus 10 includes a pair of upper and lower horizontal platforms 22, 24 and a plurality of vertical legs 26 supporting the platforms in vertically spaced relation. Preferably, the platforms 22, 24 are rectangular shaped and the legs 26, being four in number, are attached to and support the platforms 22, 24 at their respective corners. The main frame 12 is made mobile by a plurality of roller devices 28 mounted to the lower ends of the legs 26. Each roller device 28 includes a housing 30 fitted on the lower end of one leg 26 and a ball roller 32 rotatably seated within a socket 34 defined centrally on the lower side of the housing 30.

The rotary drive mechanism 14 of the apparatus 10 has an outer case 36 fixedly mounted upon the upper platform 22 of the main frame 12. The mechanism 14 includes a power source 38, such as an electric motor, housed by the case 36 and having a rotary output drive shaft 40 extending downwardly through the center of the upper platform 22.

The orbital frame 16 of the apparatus 10 is disposed between the upper and lower platforms 22, 24 of the main frame 12. The orbital frame 16 is composed of upper and lower horizontal decks 42, 44 and a plurality of support shafts 46 extending between and journalled at their opposite ends by bearings 48 to the upper and lower decks 42, 44. The support shafts 46 are located the same distance from the central axis C. A yoke 50 is attached upon the upper deck 42 and, in turn, is attached to the lower end of the output drive shaft 40 of the rotary drive mechanism 14 such that the orbital frame 16 will undergo revolution about the central axis C upon operation of the motor 38 of the rotary drive mechanism 14 to rotate the output drive shaft 40. The support shafts 46 of the orbital frame 16 define the separate orbital axes 0 angularly spaced from one another about the central axis C and located radially outwardly of the same distance from and substantially parallel to the central axis C.

The first mechanical implementation of the apparatus 10, shown in FIGS. 1 and 2, utilizes only a single orbital member 18. The orbital member 18 is mounted to one of the support shafts 46 so as to be capable of undergoing revolution with the orbital frame 16 about the central axis C when the orbital frame 16 is rotated by operation of the motor 38. The orbital member 18 also is mounted to the one support shaft 46 so as to be capable of undergoing rotation about the orbital axis O defined by the support shaft 46. The mounting connection of the orbital member 18 to the one support shaft 46 includes an annular hub 52 with an adjustable set screw 54 to permit predisposing of its center of mass is eccentric relation, and at a preset angular position relative, to the orbital axis O.

In FIGS. 1 and 2, the orbital member is in the form of a plate 18 attached to the support shaft 46 of the orbital frame 16. One or more weights 55 are mounted by a resiliently-stretchible means, such as a spring 57, on the plate 18 to define an offset center of mass of the cam plate 18 which can oscillate primarily along a line extending radially relative to the orbital axis O. The spring 57 is mounted to and extends between a pair of spaced pegs 59 mounted upright on the plate 18. Alternatively, a weight could be mounted at a stationary location on the plate 18 so as to define its center of mass as a fixed location relative to the orbital axis O.

the coupling mechanism 20 of the apparatus 10 is mounted to the lower platform 24 of the main frame 12 and is coupled to the orbital member 18 via the one vertical support shaft 46 of the orbital frame 16. The coupling mechanism 20 includes a central shaft 56 rotatably mounted to opposite ends of a cylindrical drum 61 being fixed to the lower deck 44. Also, the central shaft 56 is aligned with the central axis C by the drum 61 and non-rotatably supported at its lower end by a collar 58 mounted to lower platform 24. A locking mechanism 63 is mounted to the underside of the lower platform 24 and engaged with the central shaft 56 so as to lock it in a stationary relation to the collar 58. The central shaft 56 terminates at an upper end portion located below the orbital member 18. The coupling mechanism 20 also includes a pair of spaced pulleys 60, 62 attached respectively on the one support shaft 46 and the upper end of the central shaft 56, and an endless belt 64 entrained about the pulleys 60, 62. The one pulley 62 mounted to the non-rotatable central shaft 56 likewise does not rotate.

as rotary motion is transmitted from the rotary drive mechanism 14 to the orbital frame 16 and thus to the orbital member 18 to cause them to undergo revolution in a given direction about the central axis C, the non-rotatable one pulley 62 mounted to he central shaft 56 at the central axis C causes the other pulley 60 attached to the one support shaft 46 and thus the orbital member 18 also attached to the one support shaft 46 connected to the pulley 62 by the entrained belt 64 to rotate about the orbital axis in a direction which is the reverse of the direction of revolution of the orbital frame 16 and the orbital member 18. Further, the orbital member 18 rotates about the orbital axis O at the same frequency that it revolves about the central axis C. Thus, the coupling mechanism 20 is operable for producing rotation of the orbital member 18 about its respective orbital axis so as to maintain the center of mass of the orbital member 18 at a desired preset angular position, for example, a three o'clock position, relative to the orbital axis and thereby produce asymmetrical acceleration of the orbital member 18 relative to the central axis C to impart a substantially translational force to the main frame 12 of the apparatus 10 in the direction of the arrow A. (In FIG. 2, the dashed outline shows the orbital member 18 at a nine o'clock position.) Due to interaction with its external environment the main frame 12 will produce a substantially translational motion in the direction of the arrow A in response to the force so generated.

Figure 4:
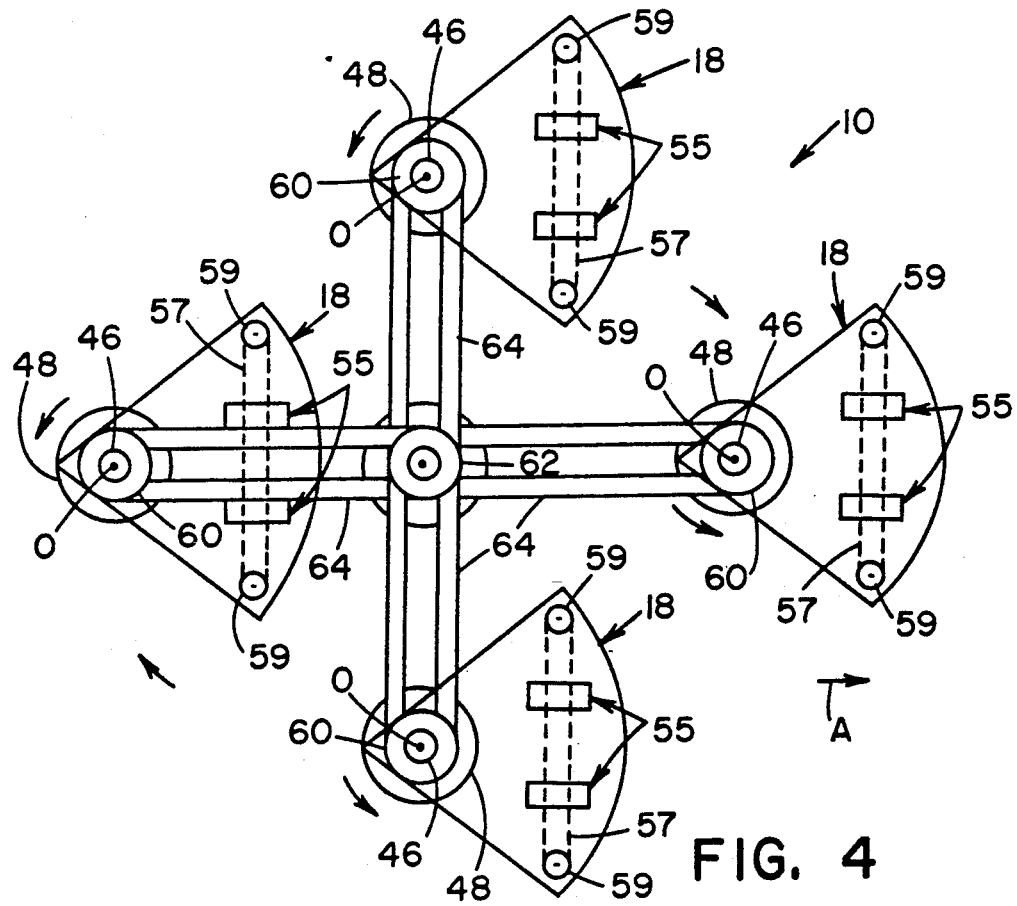
FIG. 4 is a plan view of the embodiment of the translational force generating apparatus of FIG. 3.
Figure 3:
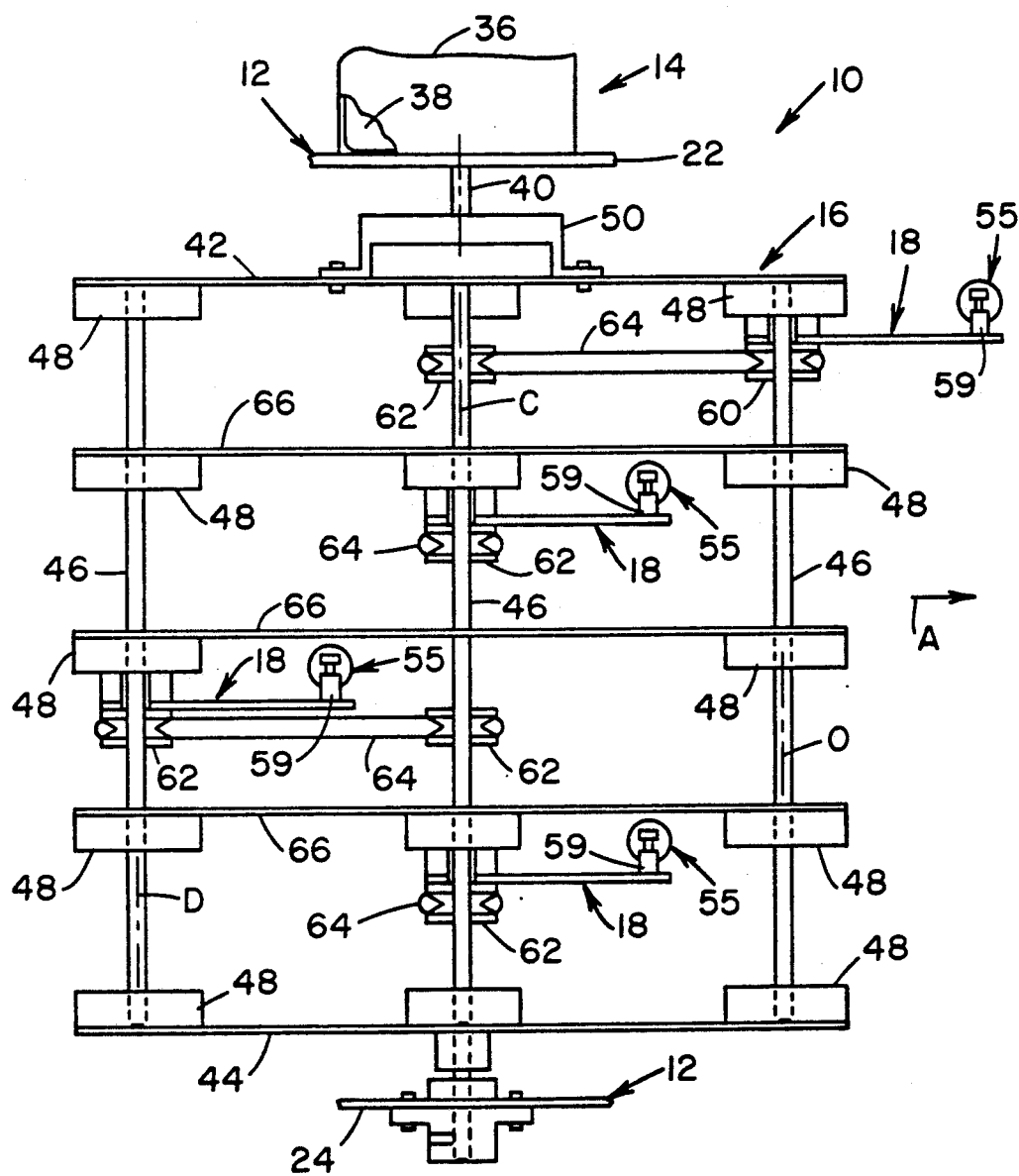
FIG. 3 is a side elevational view of another embodiment of the first mechanical implementation of the translational force generating apparatus of the present invention.

Referring to FIGS. 3 and 4, there is illustrated another embodiment of the first mechanical implementation of the translational force generating apparatus 10. This embodiment operates substantially the same as described above with respect to the embodiment of FIGS. 1 and 2, except that it employs a plurality of orbital members 18 for improved balance rather than just the single orbital member 18. Referring to FIGS. 3 and 4, the orbital members 18, for example being four in number, are now mounted to a corresponding number of support shafts 46 of the orbital frame 16. Spring-mounted weights 55 are also disposed on each of the cam plates 18 to define its offset center of mass. Also, several intermediate decks 66 have been added to the orbital frame 16 which are spaced vertically from one another and located between the upper and lower decks 42, 44. Further, a corresponding plurality of pairs of spaced pulleys 60, 62 and endless belts 64 entrained around the pulleys 60, 62 are incorporated in the embodiment of FIGS. 3 and 4 for transmitting rotary motion from the rotary drive mechanism 14 to the orbital members 18.

Figure 5:
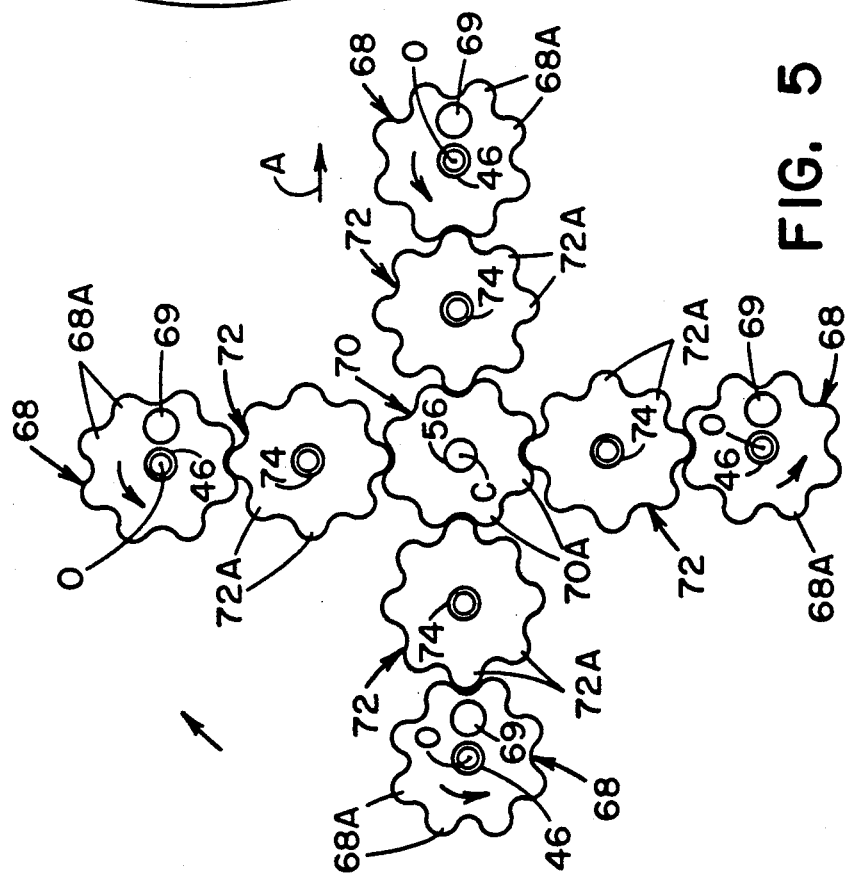
FIG. 5 is a plan view of another mechanical implementation of the translational force generating apparatus of the present invention.

Referring to FIG. 5, there is illustrated another mechanical implementation of the translational force generating apparatus 10. In this embodiment, the orbital members are orbital gears 68 having peripheral teeth 68A and being mounted to the respective support shafts 46 of the orbital frame 16. Due to the attachment of weights 69 to the orbital gears 68 at fixed locations offset from the orbital axes 0, the centers of mass of the orbital gears 68 are shifted to eccentric positions relative to the support shafts 46 and the orbital axes 0 defined by the shafts. Alternatively, weights could be mounted by springs as in the earlier embodiments.

In FIG. 5, the coupling mechanism 20 includes a center gear 70 and a plurality of intermediate gears 72 having peripheral teeth 70A, 72A. The center gear 70 is non-rotatably mounted to the central vertical shaft 56 and the intermediate gears 72 are rotatably mounted between the center gear 70 and respective orbital gears 68. The intermediate gears 72 are rotatably mounted by stub shafts 74 on one of the decks of the orbital frame 16. The teeth 68A, 70A, 72A of the respective gears 68, 70, 72 intermesh with respect to one another such that the orbital gears 68 rotate about their respective orbital axes 0 in a given direction which is the reverse of the direction of revolution of the orbital gears 68 with the orbital frame 16. Thus, the stationary center gear 70 produces rotation of the orbital gears 68 about their respective orbital axes at the same frequency as they undergo revolution with the orbital frame 16 about the central axis C so as to maintain the eccentric centers of mass of the orbital gears 68 at a desired preset angular position, for example, the three o'clock position, relative to the orbital axes 0 and thereby produce asymmetrical acceleration of the orbital gears 68 relative to the central axis C to impart a substantially translational force to the main frame 12 of the apparatus 10 in the direction of the arrow A.

Referring to FIGS. 6-9, there is shown an electromagnetic implementation of the translational force generating apparatus, generally designated 80, of the present invention. In its basic components, the translational force generating apparatus 80 includes a main frame 82, a rotary drive mechanism 84, an orbital frame 86, a plurality of orbital members 88, and a coupling mechanism 90. The rotary drive mechanism 84 is mounted to the main frame 82. The orbital frame 86 is mounted to the main frame 82 and attached to the rotary drive mechanism 84 for undergoing revolution about the central axis C upon operation of the rotary drive mechanism 84. The orbital members 88 are mounted to the orbital frame 86 for undergoing revolution with the orbital frame 86 about the central axis C. The orbital members 88 are also mounted to the orbital frame 86 for undergoing rotation about orbital axes 0 defined on the orbital frame 86 and have their centers of mass predisposed in eccentric relation to and preset angular positions relative the respective orbital axes 0. The coupling mechanism 90 is coupled to the orbital members 88 for producing rotation of the orbital members 88 in a first direction about their orbital axes 0 at the same frequency as the orbital members 88 undergo revolution with the orbital frame 86 in a second opposite direction about the central axis C. In such manner, the centers of mass of the orbital members 88 are maintained at the respective preset angular positions relative to the orbital axis 0 and thereby the orbital members 88 are asymmetrically accelerated relative to the central axis C so as to impart a substantially translational force to the main frame 82 of the apparatus 80, in the direction of arrow A. Due to interaction with its external environment the main frame 82 will produce a substantially translational motion in the direction of the arrow A in response to the force so generated.

Figure 6:
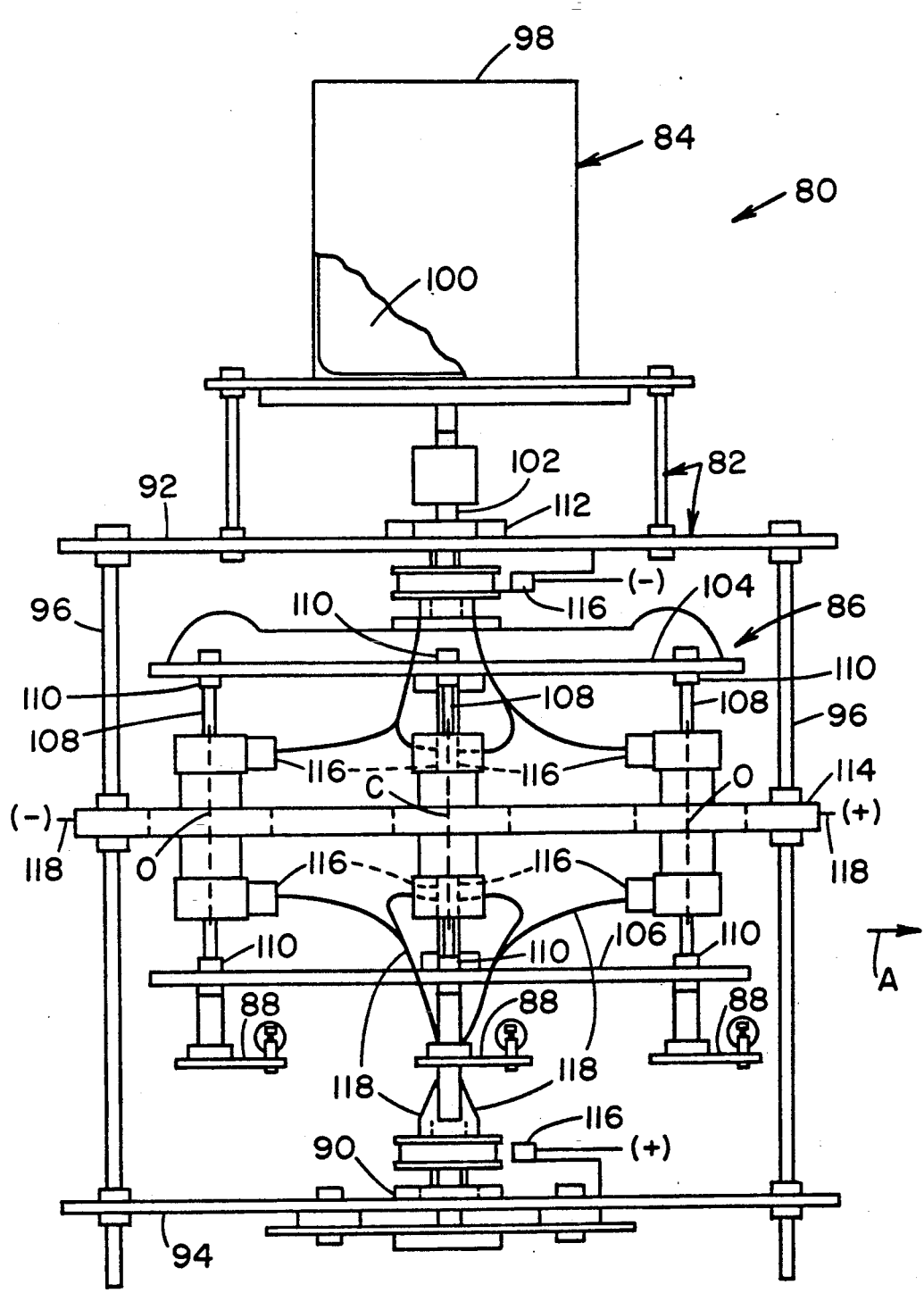
FIG. 6 is a side elevational view of an electro-magnetic implementation of the translational force generating apparatus of the present invention.
Figure 7:
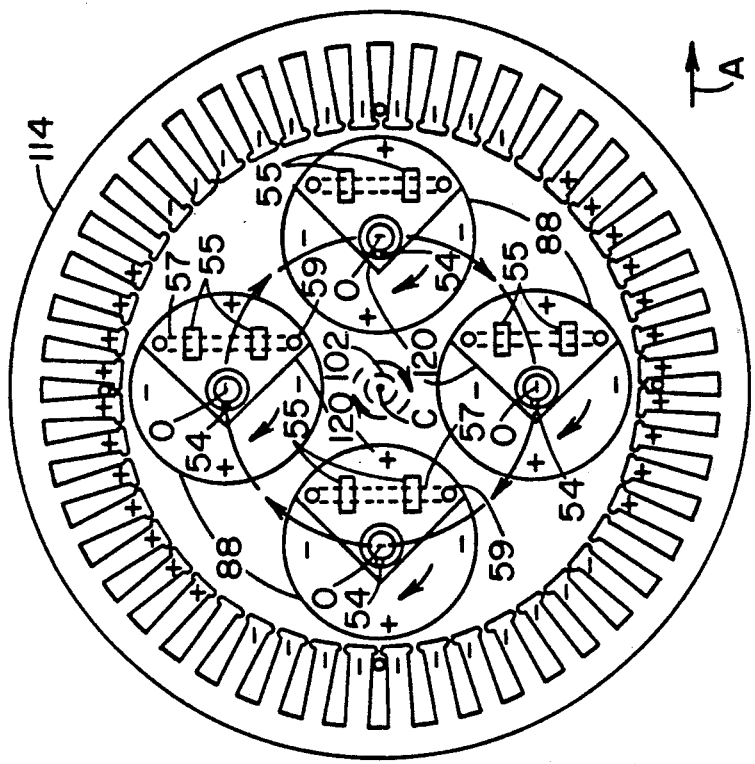
FIG. 7 is a plan view of the implementation of the translational force generating apparatus of FIG. 6.

The main frame 82, rotary drive mechanism 84, and orbital frame 86 of the apparatus 80 in FIG. 6 are substantially the same as the corresponding components of the apparatus 10 in FIGS. 1-4. The main frame 82 includes upper and lower horizontal platforms 92, 94 and a plurality of vertical legs 96 supporting the platforms in vertically spaced relation. The rotary drive mechanism 84 has an outer case 98 fixedly mounted upon the upper platform 92 of the main frame 82, a power source 100, such as an electric motor, housed by the case 98 and having a rotary output drive shaft 102 extending downwardly through the center of the upper platform 92. The orbital frame 86 is disposed between the upper and lower platforms 92, 94 of the main frame 82. The orbital frame 86 is composed of upper and lower horizontal decks 104, 106 and a plurality of support shafts 108 extending between and journalled at their opposite ends by bearings 110 to the upper and lower decks 104, 106. The support shafts 108 are located the same distance from the central axis C. A connector 112 is attached upon the upper deck 104 and, in turn, is attached to the lower end of the output drive shaft 102 of the rotary drive mechanism 84 such that the orbital frame 86 will undergo revolution about the central axis C upon operation of the motor 100 of the rotary drive mechanism 84 to rotate the output drive shaft 102. The support shafts 108 of the orbital frame 86 define the separate orbital axes 0 angularly spaced from one another about the central axis C and located radially outwardly of the same distance from and substantially parallel to the central axis C.

Figure 8:
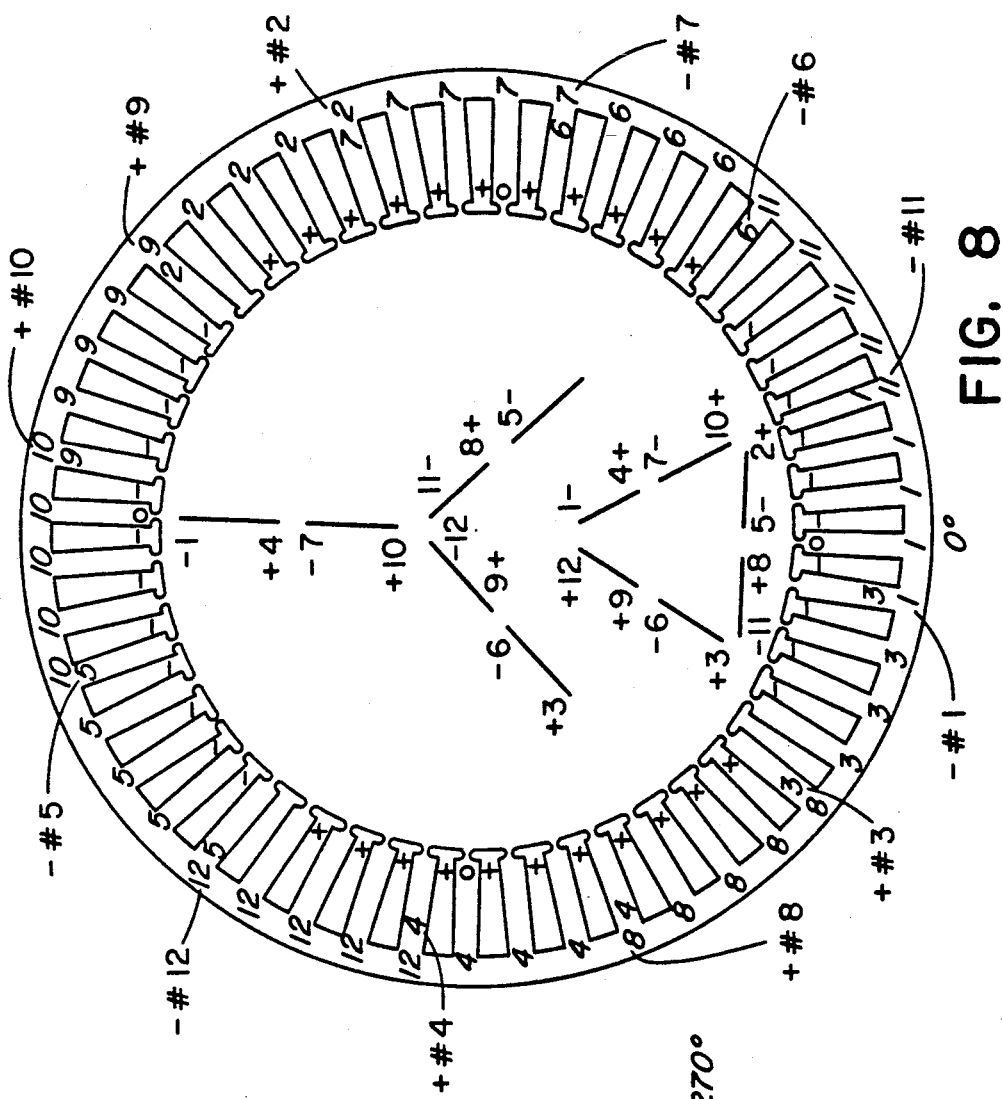
FIG. 8 is a diagram of a stator of the electro-magnetic implementation of the translational force generating apparatus of FIG. 7, being configurated as a direct current quadrupole stator.
Figure 9:
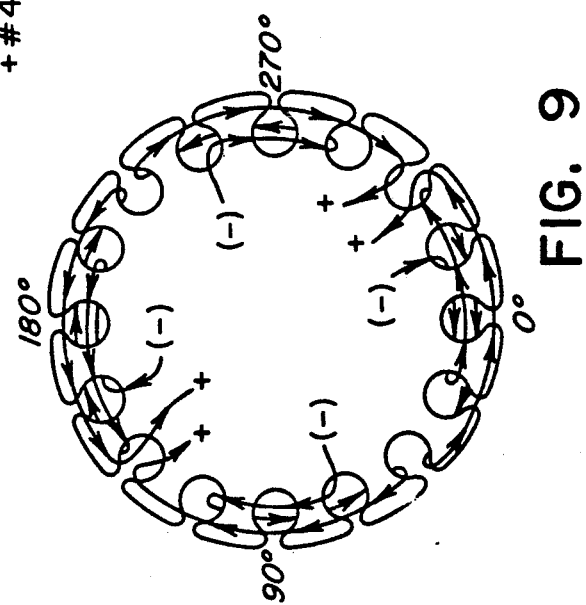
FIG. 9 is a diagram of an armature of the electromagnetic implementation of the translational force generating apparatus of FIG. 7, being configured as a direct current quadrupole armature.

In the electro-magnetic implementation of the apparatus 10, the orbital members 88 are orbital armatures mounted to the support shafts 108, and the rotation-producing coupling means is an annular stator 114 stationarily mounted to the legs 96 of the main frame 82 and surrounding the orbital armatures 88. Preferably, the armatures 88 are four in number and define a quadrupole arrangement with the stator 114. FIG. 8 is a diagram of the stator 114, showing it configured as a direct current quadrupole stator. FIG. 9 is a diagram of one of the armatures 88, showing it configured as a direct current quadrupole armature.

Particularly, as will be recognized by one of ordinary skill in this art, the diagrams of FIGS. 8 and 9 describe direct current variable voltage power supplied to the stator 114 and one armature 88; however, alternating current can be configured to the stator 114 as well as the armature 88, or any combination thereof. The stator 114 can also be configured to a dual voltage external Y-connection, or a dual voltage Y-connected start delta-connected run and implement a variable frequency drive as a source of alternating current power of 240 volts or 480 volts, etc. The use of the motor 100 can be omitted in this later configuration of the stator 114. Also by implementation of superconductors, superconductivity can be used to create superconducting magnetic fields in the electro-magnetic implementation of the system 10.

Electrical brushes and conductor leads 116, 118 are provided for conducting appropriate levels of direct current to the stator 114 and orbital armatures 88. The interactions between electro-magnetic fields created by the magnetic flux produced by such direct current flows in the stationary stator 114 and orbital armatures 88 cause the respective orbital armatures 88 to rotate about their orbital axes 0 in a direction which is the reverse of the direction of revolution of the orbital armatures 88 with the orbital frame 86.

Due to the attachment of weights 120 to the orbital armatures 88 at positions offset from the orbital axes 0, the centers of mass of the orbital armatures 88 are located in eccentric relation to the support shafts 108 and the orbital axes 0 defined by the shafts. The interaction of the electro-magnetic field of the stator 114 with the orbital armatures 88 produces rotation of the orbital members 88 in a first direction about their orbital axes 0 so as to maintain the eccentric centers of mass of the orbital armatures 88 at respective desired preset angular positions, for example, the three o'clock position, relative to the orbital axis 0 as the orbital armatures 88 undergo revolution with the orbital frame 86 in a second opposite direction about the central axis C. In such manner, the orbital armatures 88 are accelerated asymmetrically relative to the central axis C so as to impart translational motion to the main frame 82 of the apparatus 80 in the direction of arrow A.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A translational force generating apparatus, comprising:

(a) means for generating rotary drive motion;

(b) orbital means attached to said rotary drive motion generating means for undergoing revolution about a central axis upon operation of said rotary drive means, said orbital means having a portion defining an orbital axis located radially outwardly of and substantially parallel to said central axis;

(c) an orbital mass mounted to said portion of said orbital means for undergoing revolution with said orbital means about said central axis, said orbital mass also mounted to said orbital means portion for undergoing rotation about said orbital axis and for predisposing the center of mass of said orbital mass in an eccentric relation, and at a preset angular position relative, to said orbital axis;

(d) at least one weight;

(e) a resiliently stetchible means mounting said weight on said orbital mass such that said weight can oscillate primarily along a line extending radially relative to said orbital axis so as to define said center of mass of said orbital mass at a variable location relative to said orbital axis; and (f) rotation-producing coupling means coupled to said orbital mass for producing rotation of said orbital mass in a first direction about said orbital axis at the same frequency as said orbital mass undergoes revolution with said orbital means in a second opposite direction about said central axis so as to maintain the eccentric center of mass of said orbital mass at said preset angular position relative to said orbital axis and thereby produce an asymmetrical acceleration of said orbital mass relative to said central axis so as to impart a substantially translational force to said apparatus.

2. The apparatus of claim 1 wherein:
said orbital means portion is a support shaft; and
said orbital mass is a plate attached to said support shaft with the center of mass of said plate offset from said shaft.

3. A translational force generating apparatus, comprising:
(a) a main frame;
(b) a rotary drive mechanism mounted on said main frame;
(c) an orbital frame mounted to said main frame and attached to said rotary drive mechanism for undergoing revolution about a central axis upon operation of said rotary drive mechanism, said orbital frame having at least one support shaft defining an orbital axis located radially outwardly of and substantially parallel to said central axis;
(d) an orbital member mounted to said support shaft of said orbital frame for undergoing revolution with said orbital frame about said central axis, said orbital member also mounted to said support shaft for undergoing rotation about said orbital axis and for predisposing its center of mass in an eccentric relation, and at a preset angular position relative, to said orbital axis;
(e) at least one weight;
(f) a resiliently stretchible means mounting said weight on said orbital member such that said weight can oscillate primarily along a line extending radially relative to said orbital axis so as to define said center of mass of said orbital member at a variable location relative to said orbital axis; and
(g) rotation-producing coupling means coupled to said orbital member for producing rotation of said orbital member in a first direction about said orbital axis at the same frequency as said orbital member undergoes revolution with said orbital frame in a second opposite direction about said central axis so as to maintain the eccentric center of mass of said orbital member at said preset angular position relative to said orbital axis and thereby produce an asymmetrical acceleration of said orbital member relative to said central axis so as to impart a substantially translational force to said main frame of said apparatus.

4. The apparatus of claim 3 wherein said orbital member is a plate attached to said support shaft with the center of mass of said plate offset from said shaft.

5. A translational force generating apparatus, comprising:
(a) a main frame;
(b) a rotary drive mechanism mounted on said main frame;
(c) an orbital frame mounted to said main frame and attached to said rotary drive mechanism for undergoing revolution about said central axis upon operation of said rotary drive mechanism, said orbital frame having a plurality of support shafts defining separate orbital axes angularly spaced from one another about said central axis and located radially outwardly the same distance from and substantially parallel to said central axis;
(d) a plurality of orbital members each mounted to a respective one of said support shafts of said orbital frame for undergoing revolution with said orbital frame about said central axis, said orbital members also mounted to said respective support shafts for undergoing rotation about said orbital axes and respectively predisposing their centers of mass in eccentric relation, and at preset angular positions relative, to said respective orbital axes;
(e) at least one weight;
(f) a resiliently stretchible means mounting said weight on said orbital member such that said weight can oscillate primarily along a line extending radially relative to said orbital axis so as to define said center of mass of said orbital member at a variable location relative to said orbital axis; and
(g) rotation-producing coupling means coupled to said orbital members for producing rotation of said orbital members in a first direction about said orbital axes at the same frequency as said orbital members undergo revolution with said orbital frame in a second opposite direction about said central axis so as to maintain said orbital members at said preset angular positions relative to said respective orbital axes and thereby produce asymmetrical acceleration of said orbital members relative to said central axis so as to impart a substantially translational force to said main frame of said apparatus.

6. The apparatus of claim 5 wherein said each orbital member is a plate attached to a respective one of said support shafts with the center of mass of said plate offset from said shaft.

7. A translational force generating apparatus, comprising:
(a) means for generating rotary drive motion;
(b) orbital means attached to said rotary drive motion generating means for undergoing revolution about a central axis upon operation of said rotary drive means, said orbital means having a portion defining an orbital axis located radially outwardly of and substantially parallel to said central axis;
(c) an orbital mass mounted to said portion of said orbital means for undergoing revolution with said orbital means about said central axis, said orbital mass also mounted to said orbital means portion for undergoing rotation about said orbital axis and for predisposing the center of mass of said orbital mass in an eccentric relation, and at a preset angular position relative, to said orbital axis; and
(d) rotation-producing coupling means coupled to said orbital mass for producing rotation of said orbital mass in a first direction about said orbital axis at the same frequency as said orbital mass undergoes revolution with said orbital means in a second opposite direction about said central axis so as to maintain the eccentric center of mass of said orbital mass at said preset angular position relative to said orbital axis and thereby produce an asymmetrical acceleration of said orbital mass relative to said central axis so as to impart a substantially translational force to said apparatus;

(e) said rotation-producing coupling means being a pair of spaced pulleys and an endless belt entrained about said pulleys for transmitting rotary motion from said rotary drive motion generating means to said orbital mass, one of said pulleys being mounted at said central axis and the other of said pulleys being attached to said orbital means portion such that said pulleys and entrained belt cause rotation of said orbital mass about said orbital axis in said first direction which is the reverse of said second opposite direction of revolution of said orbital means and mass.

8. A translational force generating apparatus, comprising:

(a) means for generating rotary drive motion;

(b) orbital means attached to said rotary drive motion generating means for undergoing revolution about a central axis upon operation of said rotary drive means, said orbital means having a portion defining an orbital axis located radially outwardly of an d substantially parallel to said central axis;

(c) an orbital mass mounted to said portion of said orbital means for undergoing revolution with said orbital means about said central axis, said orbital mass also mounted to said orbital means portion for undergoing rotation about said orbital axis and for predisposing the center of mass of said orbital mass in an eccentric relation, and at a preset angular position relative, to said orbital axis; and (d) rotation-producing coupling means coupled to said orbital mass for producing rotation of said orbital mass in a first direction about said orbital axis at the same frequency as said orbital mass undergoes revolution with said orbital means in a second opposite direction about said central axis so as to maintain the eccentric center of mass of said orbital mass at said preset angular position relative to said orbital axis and thereby produce an asymmetrical acceleration of said orbital mass relative to said central axis so as to impart a substantially translational force to said apparatus;

(e) said orbital mass being an armature attached to said orbital means portion with the center of mass of said armature offset from said portion;

(f) said rotation-producing coupling means being an stationary annular stator surrounding said armature such that interaction between electro-magnetic fields of said stator and armature causes said armature to rotate about said orbital axis in said first direction which is the reverse of said second opposite direction of revolution of said armature.

9. A translational force generating apparatus, comprising:

(a) a main frame;

(b) a rotary drive mechanism mounted on said main frame;

(c) an orbital frame mounted to said main frame and attached to said rotary drive mechanism for undergoing revolution about a central axis upon operation of said rotary drive mechanism, said orbital frame having at least one support shaft defining an orbital axis located radially outwardly of and substantially parallel to said central axis;

(d) an orbital member mounted to said support shaft of said orbital frame for undergoing revolution with said orbital frame about said central axis, said orbital member also mounted to said support shaft for undergoing rotation about said orbital axis and for predisposing its center of mass in an eccentric relation, and at a preset angular position relative, to said orbital axis; and (e) rotation-producing coupling means coupled to said orbital member for producing rotation of said orbital member in a first direction about said orbital axis at the same frequency as said orbital member undergoes revolution with said orbital frame in a second opposite direction about said central axis so as to maintain the eccentric center of mass of said orbital member at said preset angular position relative to said orbital axis and thereby produce an asymmetrical acceleration of said orbital member relative to said central axis so as to impart a substantially translation force to said main frame of said apparatus;

(f) said rotation-producing coupling means being a pair of spaced pulleys and an endless belt entrained about said pulleys for transmitting rotary motion from said rotary drive mechanism to said orbital member, one of said pulleys being mounted at said central axis and the other of said pulleys being attached to said support shaft such that said pulleys and entrained belt cause rotation of said orbital member about said orbital axis in said first direction which is the reverse of said second opposite direction of revolution of said orbital frame and member.

10. A translation force generating apparatus, comprising:

(a) a main frame;

(b) a rotary drive mechanism mounted on said main frame;

(c) an orbital frame mounted to said main frame and attached to said rotary drive mechanism for undergoing revolution about a central axis upon operation of said rotary drive mechanism, said orbital frame having at least one support shaft defining an orbital axis located radially outwardly of and substantially parallel to said central axis;

(d) an orbital member mounted to said support shaft of said orbital frame for undergoing revolution with said orbital frame about said central axis, said orbital member also mounted to said support shaft for undergoing rotation about said orbital axis and for predisposing its center of mass in an eccentric relation, and at a preset angular position relative, to said orbital axis; and (e) rotation-producing coupling means coupled to said orbital member for producing rotation of said orbital member in a first direction about said orbital axis at the same frequency as said orbital member undergoes revolution with said orbital frame in a second opposite direction about said central axis so as to maintain the eccentric center of mass of said orbital member at said preset angular position relative to said orbital axis and thereby produce an asymmetrical acceleration of said orbital member relative to said central axis so as to impart a substantially translation force to said main frame of said apparatus;

(f) said orbital member being an armature attached to said support shaft with the center of mass of aid armature offset from said shaft;

(g) said rotation-producing coupling means being an stationary annular stator surrounding said armature such that interaction between electro-magnetic fields of said stator and armature causes said armature to rotate about said orbital axis in said first direction which is the reverse of said second opposite direction of revolution of said armature.

11. A translation force generating apparatus, comprising:
   (a) a main frame;
   (b) a rotary drive mechanism mounted on said main frame;
   (c) an orbital frame mounted to said main frame and attached to said rotary drive mechanism for undergoing revolution about said central axis upon operation of said rotary drive mechanism, said orbital frame having a plurality of support shafts defining separate orbital axes angularly spaced from one another about said central axis and located radially outwardly the same distance from and substantially parallel to said central axis;
   (d) a plurality of orbital members each mounted to a respective one of said support shafts of said orbital frame for undergoing revolution with said orbital frame about said central axis, said orbital members also mounted to said respective support shafts for undergoing rotation about said orbital axes and respectively predisposing their centers of mass in eccentric relation, and at preset angular positions relative, to said respective orbital axes; and
   (e) rotation-producing coupling means coupled to said orbital members for producing rotation of said orbital members in a first direction about said orbital axes at the same frequency as said orbital members undergo revolution with said orbital frame in a second opposite direction about said central axis so as to maintain said orbital members at said preset angular positions relative to said respective orbital axes and thereby produce asymmetrical acceleration of said orbital members relative to said central axis so as to impart a substantially translational force to said mainframe of said apparatus;
   (f) said rotation-producing coupling means being a plurality of pairs of spaced pulleys and endless belts entrained around said pulleys for transmitting rotary motion from said rotary drive mechanism to said orbital members, one of said pulleys of each pair being mounted at said central axis and the other of said pulleys of each pair being attached to a respective one of said support shafts such that said pairs of pulleys and entrained belts cause rotation of said orbital members about said orbital axis in said first direction which is the reverse of said second opposite direction of revolution of said orbital frame and orbital members.

12. A translational force generating apparatus, comprising:
   (a) a main frame;
   (b) a rotary drive mechanism mounted on said main frame;
   (c) an orbital frame mounted to said main frame and attached to said rotary drive mechanism for undergoing revolution about said central axis upon operation of said rotary drive mechanism, said orbital frame having a plurality of support shafts defining separate orbital axes angularly spaced from one another about said central axis and located radially outwardly the same distance from and substantially parallel to said central axis;
   (d) a plurality of orbital members each mounted to a respective one of said support shafts of said orbital frame for undergoing revolution with said orbital frame about said central axis, said orbital members also mounted to said respective support shafts for undergoing rotation about said orbital axes and respectively predisposing their centers of mass in eccentric relation, and at preset angular positions relative, to said respective orbital axes; and
   (e) rotation-producing coupling means coupled to said orbital members for producing rotation of said orbital members in a first direction about said orbital axes at the same frequency as said orbital members undergo revolution with said orbital frame in a second opposite direction about said central axis so as to maintain said orbital members at said preset angular positions relative to said respective orbital axes and thereby produce asymmetrical acceleration of said orbital members relative to said central axis so as to impart a substantially translational force to said main frame of said apparatus.
   (f) said each orbital member being an armature attached to a respective one of said support shafts with the center of mass of said armature offset from said shaft;
   (g) said rotation-producing coupling means being an stationary annular stator surrounding said armatures such that interactions between electro-magnetic fields of said stator and armatures cause said armatures to rotate about said respective orbital axes in said first direction which is the reverse of said second opposite direction of revolution of said orbital frame and orbital armatures.

* * * * *